(12) United States Patent
Beak

(10) Patent No.: US 8,233,658 B2
(45) Date of Patent: Jul. 31, 2012

(54) SECURITY SYSTEM USING ENCODED IMAGE WITH PUZZLED IMAGE

(76) Inventor: Gy Young Beak, Daejeon (KR)

( * ) Notice: Subject to any disclaimer, the term of this patent is extended or adjusted under 35 U.S.C. 154(b) by 372 days.

(21) Appl. No.: 12/671,131

(22) PCT Filed: Jul. 25, 2008

(86) PCT No.: PCT/KR2008/004368
§ 371 (c)(1),
(2), (4) Date: Jan. 28, 2010

(87) PCT Pub. No.: WO2009/017342
PCT Pub. Date: Feb. 5, 2009

(65) Prior Publication Data
US 2010/0322464 A1    Dec. 23, 2010

(30) Foreign Application Priority Data

Jul. 30, 2007    (KR) .......................... 10-2007-0076206

(51) Int. Cl.
*G06K 9/00* (2006.01)
*G06K 9/46* (2006.01)
(52) U.S. Cl. .......................... 382/100; 382/181; 382/232
(58) Field of Classification Search .................. 382/100, 382/181, 232; 345/555; 348/384.1–440.1; 358/426.01–426.16; 380/1, 30, 255, 277
See application file for complete search history.

(56) References Cited

U.S. PATENT DOCUMENTS

| | | |
|---|---|---|
| 2006/0045361 A1 | 3/2006 | Yokose |
| 2008/0137848 A1* | 6/2008 | Kocher et al. ................. 380/201 |
| 2009/0063557 A1* | 3/2009 | MacPherson ............. 707/103 R |
| 2009/0063675 A1* | 3/2009 | Faris et al. .................... 709/224 |
| 2011/0255690 A1* | 10/2011 | Kocher et al. ................. 380/210 |

FOREIGN PATENT DOCUMENTS

| | | |
|---|---|---|
| JP | 2006259046 | 9/2006 |
| WO | 0045336 | 8/2000 |

OTHER PUBLICATIONS

International Search Report.

* cited by examiner

*Primary Examiner* — Samir Ahmed
*Assistant Examiner* — Mehdi Rashidian
(74) *Attorney, Agent, or Firm* — H.C. Park & Associates, PLC

(57) ABSTRACT

Disclosed is a system for encoding an original image 10 using an image puzzle-type encoded image 20, and more particularly to a system for encoding an original image 10 using an image puzzle-type encoded image 20, in which an original image 10 including a photograph, a picture, a document, a character, a number, a fingerprint, or an iris image is divided into image pieces having a predetermined size and the divided image pieces are arranged according to a designated pattern so as to generate the image puzzle-type encoded image 20, so that it is possible to minimize the disclosure of information of the original image 10 using the image puzzle-type encoded image 20. The system includes an image encoding terminal 100 for converting the original image 10 into the encoded image 20 according to a image puzzling pattern so as to express the converted encoded image 20 on an encoded image expressing part 500, an image decoding terminal 200 for obtaining the encoded image 20 expressed on the encoded image expressing part 500 so as to restore the original image 10 according to the image puzzling pattern, and an image encoding server 300 for communicating with the image encoding terminal 100 and the image decoding terminal 200 so as to provide the image puzzling pattern.

17 Claims, 4 Drawing Sheets

[Figure 1]
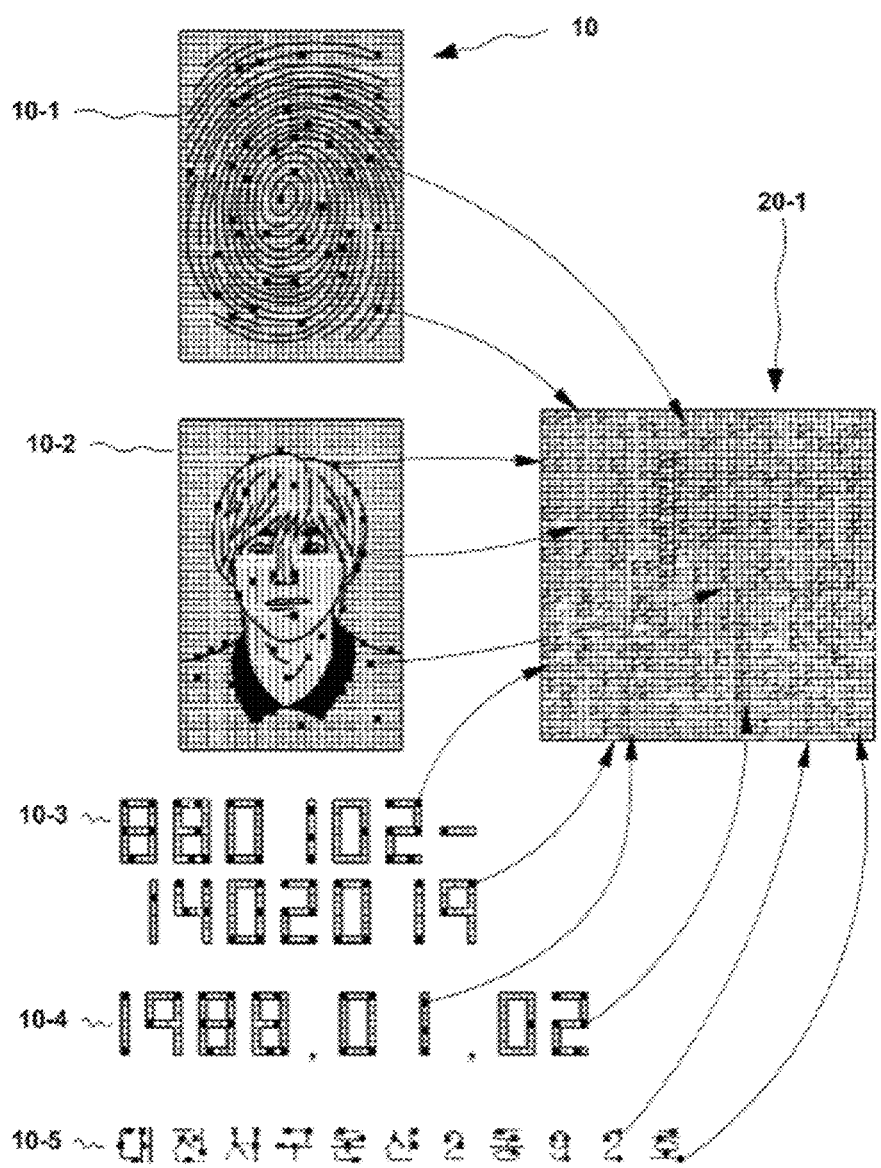

[Figure 2]
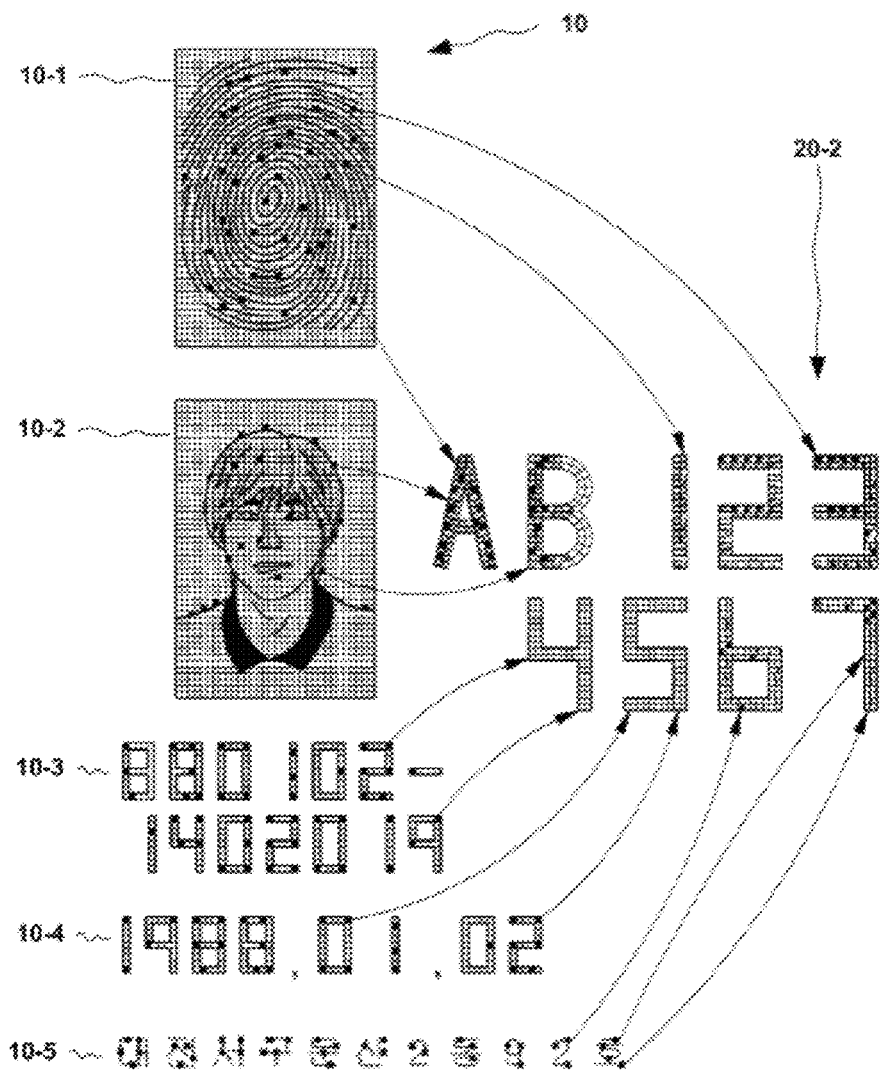

[Figure 3]
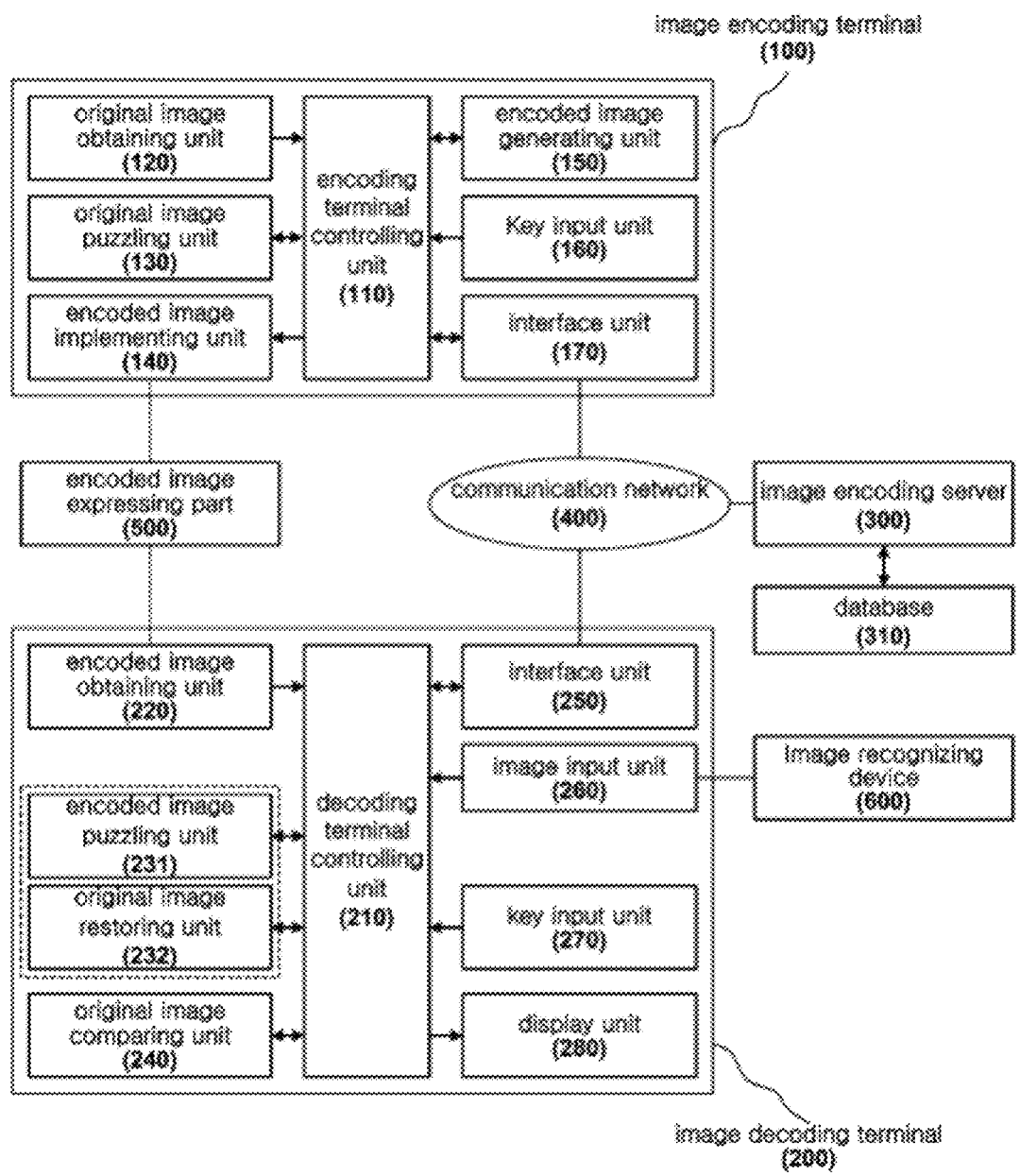

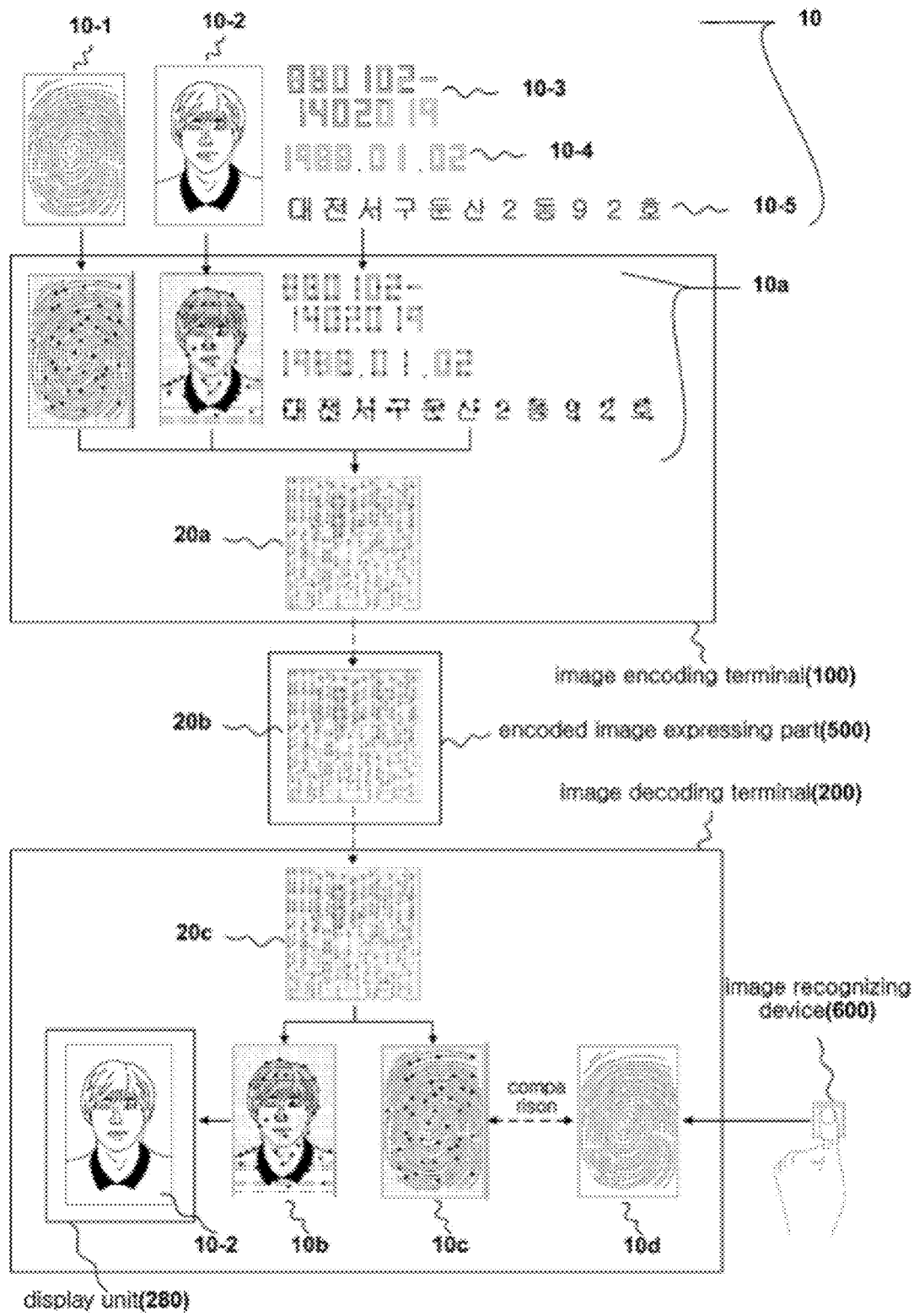

SECURITY SYSTEM USING ENCODED IMAGE WITH PUZZLED IMAGE

CROSS-REFERENCE TO RELATED APPLICATIONS

This application is the National Stage of International Application No. PCT/KR2008/004368, filed Jul. 25, 2008, and claims priority from and the benefit of Korean Patent Application No. 10-2007-0076206, filed on Jul. 30, 2007, which are both hereby incorporated by reference for all purposes as if fully set forth herein.

BACKGROUND OF THE INVENTION

1. Field of the Invention

The present invention relates to a system for encoding an original image 10 using an image puzzle-type encoded image 20, and more particularly to a system for encoding an original image 10 using an image puzzle-type encoded image 20, in which an original image 10 including a photograph, a picture, a document, a character, a number, a fingerprint, or an iris image is divided into image pieces having a predetermined size and the divided image pieces are arranged according to a designated pattern so as to generate the image puzzle-type encoded image 20, so that it is possible to minimize the disclosure of information of the original image 10 using the image puzzle-type encoded image 20.

2. Discussion of the Background

In a modern society, a prescribed identification of a person or an authentification process has been required in order to enjoy cultural benefits provided as a social activity scope of an individual becomes broad and complicated. For example, a person should present a resident registration card, a driver's license, a passport, an employee ID card, or the like, in order to pass a specific place or identify the person in question. Further, the person should input one's name, address, resident registration number, authentication key, security key, or the like, or input one's physical information, such as a fingerprint, in order to use various services.

However, when the person presents an identification card or input the physical information, the personal information comes to be disclosed to the concerned parties, so that the problems occur in that another person obtains the personal information and maliciously uses the information, or uses the information in various crimes. Specifically, the once disclosed personal information is rapidly propagated online due to the development of the internet communication network, so that damage returning to the person in charge is dramatically increased.

In general, as a means for preventing copying or the forgery of the identification card (the resident registration card, a driver license, a passport, an employee ID card, or the like) or securities, a fine printing technology, such as a foil stripe insertion, a minute character, florescent ink, a pattern formation, intaglio printing, non-florescent paper, watermark, hologram, barcode, or the like, has been used. However, certain information indicated in the prints includes information that should not be disclosed to the public. Therefore, the said information being disclosed in non-interested parties frequently occurs, even though the copying or the forgery is simply prevented.

Recently, many countries have intended to introduce an electronic passport in which an electronic chip including physical information, such as not only face information, but also fingerprint information or iris image information, is mounted in order to secure the safety of the airline service. However, the method of inserting physical information of not only a general person but also a criminal in the electronic passport can be maliciously used for a crime due to the leak of the physical information so that the controversy on the method occurs even in the developed countries, so that the electronic passport including the electronic chip cannot be easily introduced.

In order to solve the problem, there is provided a method in which security information of an original identification card is printed as an encoded code to prevent the disclosure of security information to the general public and the security information corresponding to the encoded code is read as needed, to be identified. However, according to the above method, it is possible to obtain the security information of the stored original identification card only with the encoded code regardless of truth or false of the original identification card, so that the method has a disadvantage in that the security is weak.

Further, there has been suggested a method in which the security information of the identification card is encoded and stored in various chips, a magnetic card, a smart card, or an RFID tag, and the security information can be read only with a specific security device capable of decoding the encoding information so that the leak of the information can be prevented. However, as a technique for decoding the encryption is gradually developed, the encoding technique should be continuously updated due to the lack of long-term effectiveness. Further, it is difficult to basically prevent the leak of the information upon using the security device.

SUMMARY OF THE INVENTION

Therefore, an object of the present invention is to provide a system for encoding an original image using an image puzzle-type encoded image, in which, even though another person obtains the prints and stored data, original information included in the prints or stored data cannot be disclosed.

Another object of the present invention is to provide a system for encoding an original image using an image puzzle-type encoded image, in which original information is encoded but it is impossible to obtain the original information only with a value of an encoded code so that the corresponding original information can be restored only if a person has the encoded image.

In accordance with an aspect of the present invention, there is provided a system for encoding an original image 10 using an image puzzle-type encoded image 20 in which the original image 10 is divided into a plurality of image pieces having a predetermined size and the image pieces are arranged on an encoded image expressing part 500 according to a designated image puzzling pattern so as to generate the encoded image 20, the system including: a database 310 for storing a keycode value corresponding to the image puzzling pattern; an image encoding server 300 for generating the image puzzling pattern corresponding to the received keycode value to transmit the generated image puzzling pattern if receiving the keycode value through a communication network 400 and a request for image encoding information, storing the received keycode value and the generated image puzzling pattern to the database 310, and reading the image puzzling pattern corresponding to the received keycode value from the database 310 to transmit the read image puzzling pattern if receiving the keycode value through a communication network 400 and a request for image decoding information; an image encoding terminal 100 for obtaining the original image 10, dividing the original image 10 into the image pieces having the predetermined size, requesting encoding information including the keycode value to the image encoding server 300 so as to receive the image puzzling pattern, arranging the image pieces according to the received image puzzling pattern so as to generate the encoded image 20, and expressing the generated encoded image 20 on the encoded image expressing part 500 in which the keycode value is selectively expressed on the encoded image expressing part 500; and an image decoding terminal 200 for recognizing the encoded image 20 and the keycode value from the encoded image expressing part 500, requesting an input of the keycode value to a user if it fails to recognize the keycode value so as to receive the input of the keycode value, requesting decoding information including the keycode value to the image encoding server 300 so as to receive the image puzzling pattern, dividing the encoded image 20 into the image pieces according to the received image puzzling pattern so as to re-arrange the image pieces, and obtaining the original image 10.

As described above, according to the present invention, the information of the original image 10 including the photograph, the picture, the document, the character, the number, the fingerprint, or the iris image is printed as an encoded image 20 incapable of being recognized by another person or stored in a memory-type card, so that the security information can be prevented from being disclosed to another person, and the person can safely use the encoded image 20, even though another person obtains the encoded image 20.

Further, according to the present invention, the original image 10 can be restored only if the person has the encoded image 20 configured with the image pieces of the original image 10, and also the original image 10 is restored only with the authorized specific terminal so that security is high. Further, the specific terminal can be connected with the encoding server so as to restore only the selected original image 10 so that other information not-desired to be disclosed cannot be recognized, thereby further minimizing the possibility of leak of the information.

BRIEF DESCRIPTION OF THE DRAWINGS

The foregoing and other objects, features and advantages of the present invention will become more apparent from the following detailed description when taken in conjunction with the accompanying drawings in which:

FIG. 1 is a diagram illustrating a process of generating an image puzzle-type encoded image according to a first exemplary embodiment of the present invention;

FIG. 2 is a diagram illustrating a process of generating an image puzzle-type encoded image according to a second exemplary embodiment of the present invention;

FIG. 3 is a block diagram illustrating a system for encoding an original image using an image puzzle-type encoded image according to an exemplary embodiment of the present invention; and FIG. 4 is a flowchart illustrating a process of encoding and decoding an original image using the system for encoding the original image of FIG. 3.

DETAILED DESCRIPTION OF THE ILLUSTRATED EMBODIMENTS

Hereinafter, exemplary embodiments of the present invention will be described with reference to the accompanying drawings for those skilled in the art to easily conceive the present invention.

<Exemplary Embodiment 1: image puzzle-type encoded image>

FIG. 1 is a diagram illustrating a process of generating an image puzzle-type encoded image 20-1 according to a first exemplary embodiment of the present invention. Original images 10 including a fingerprint 10-1, a face picture 10-2, a residence registration number 10-3, a birth date 10-4, and an address 10-5 are divided into image pieces having a predetermined image and the image pieces are arranged according to a designated image puzzling pattern, so as to generate the image puzzle-type encoded image 20-1.

The image puzzle-type encoded image 20-1 is not represented as a specific formation. Therefore, only if the image puzzle-type encoded image 20-1 is re-arranged according to the image puzzling pattern used for arranging the image pieces it is possible to recognize information of the original image 10.

Further, it is preferred that the image puzzling pattern is designated for every original image (10-1 to 10-5), respectively, and at this time, a formation pattern of the image puzzling pattern should be designated in order for the image pieces divided from one original image not to be overlapped with those divided from another original image on the encoded image 20-1.

In FIG. 1, a single encoded image 20-1 is generated from a plurality of original images 10-1 to 10-5, but a single encoded image 20-1 can be generated from a single original images 10.

Further, as shown in FIG. 1, the original image 10 can include at least one of a picture or an image, such as a fingerprint 10-1 or a face picture 10-2, a character, a document, or a number, such as the residence registration number 10-3, the birth date 10-4, or the address 10-5, the iris image (not shown), and a pattern.

According to a method for restoring the original image 10 from the encoded image 20-1, the encoded image 20-1 is divided into the image pieces having the predetermined size and the image pieces are re-arranged according to the image puzzling pattern in a reverse manner. Therefore, it is preferred that the image puzzling pattern includes size information of the image piece and information on the coordinates on which each image piece is positioned on the original image 10 and the encoded image 20-1.

<Exemplary Embodiment 2: image puzzle-type encoded image>

FIG. 2 is a diagram illustrating a process of generating an image puzzle-type encoded image 20-2 according to a second exemplary embodiment of the present invention. As shown in FIG. 1, the original images 10 including the fingerprint 10-1, the face picture 10-2, the residence registration number 10-3, the birth date 10-4, and the address 10-5 are divided into image pieces having a predetermined size, and the image pieces are arranged according to the designated image puzzling pattern to represent a passport number, so as to generate the image puzzle-type encoded image 20-2. That is, the image puzzle-type encoded image 20-2 is configured with a combination of the image pieces, wherein an outline formed by a connecting state of the image pieces represents the passport number. The image puzzle-type encoded image 20-2 itself includes specific information and the specific information can be constructed to correspond to the image puzzling pattern.

<System for Encoding Original Image>

FIG. 3 is a block diagram illustrating a system for encoding an original image using an image puzzle-type encoded image according to an exemplary embodiment of the present invention.

The system for encoding the original image includes a database 310, an image encoding server 300, an image encoding terminal 100, and an image decoding terminal 200. The system for encoding the original image expresses the encoded image 20 generated by the image encoding terminal 100 on an encoded image expressing part 500.

The image encoding terminal 100 obtains the original image 10 as image data, receives an input of a keycode value, requests the image puzzling pattern corresponding to the inputted keycode value to the image encoding server 300, and receives the requested image puzzling pattern from the image encoding server 300. Further, the image encoding terminal 100 divides the original image 10 into the image pieces according to the received image puzzling pattern and re-arranges the image pieces so as to generate the encoded image 20, and expresses the generated encoded image 20 on the encoded image expressing part 500 in which the encoded image 20 is printed on the encoded image expressing part 500 or stored as the image data on the encoded image expressing part 500.

Further, if the image encoding terminal 100 receives the control input from a user for representing the encoded image as the keycode value, the expressed shape of the encoded image represents the keycode value when the encoded image is generated according to the image puzzling pattern. To this end, it is preferred that the image encoding terminal 100 requests the image puzzling pattern for representing the encoded image as the keycode value to the image encoding server 300.

Further, if there is a plurality of original images 10, it is preferred that the image encoding terminal 100 receives an identifier for each original image 10 from the user and requests the image puzzling pattern for each identifier to the image encoding server 300.

The database 310 stores the image puzzling pattern corresponding to the keycode value. If a plurality of image puzzling patterns correspond to one keycode value, the database 310 stores the image puzzling pattern including the identifier corresponding to each pattern.

When the image encoding server 300 receives a request for encoding information including the keycode value from the image encoding terminal 100 through a communication network 400, the image encoding server 300 generates the image puzzling pattern corresponding to the requested information, transmits the generated image puzzling pattern to the image encoding terminal 100, and stores the received keycode value and the generated image puzzling pattern to the database 310. If the plurality of identifiers is included in the image encoding information, the image encoding server 300 makes the image puzzling pattern to correspond to each identifier.

Further, if the image encoding server 300 receives the keycode value from the image decoding terminal 200 through the communication network 400 and receives the request for image decoding information, the image encoding server 300 reads the image puzzling pattern corresponding to the received keycode value from the database 310 and transmits the read image puzzling pattern. If the image decoding information includes at least one identifier, the image encoding server 300 transmits the image puzzling pattern corresponding to the identifier.

The image decoding terminal 200 recognizes the encoded image 20 and the keycode value from the encoded image expressing part 500. If the image decoding terminal 200 fails to recognize the keycode value, the image decoding terminal 200 requests the input of the keycode value to the user so as to receive the keycode value. Further, the image decoding terminal 200 requests the image puzzling pattern corresponding to the keycode value to the image encoding server 300, receives the requested image puzzling pattern, divides the encoded image 20 according to the received image puzzling pattern so as to generate the image pieces, re-arranges the generated image pieces, and obtains the original image 10. Further, if the image decoding terminal 200 receives the input of the identifier from the user, the image decoding terminal 200 requests only the image puzzling pattern corresponding to the inputted identifier to the image encoding server 300 and receives only the corresponding image puzzling pattern.

In particular, the image encoding terminal 100 includes a key input unit 160 for receiving the input of the keycode value or the identifier and a control signal, the control signal determining whether or not to express the identifier on the encoded image expressing part 500, an original image obtaining unit 120 for recognizing at least one original image 10 and obtaining the recognized original images as digital data, an original image puzzling unit 130 for dividing the obtained original image 10 in a predetermined size so as to generate the image pieces, an interface unit 170 for transmitting an encoding information request signal including the inputted keycode value or identifier to the image encoding server 300 through the communication network 400 and receiving the corresponding image puzzling pattern, an encoded image generating unit 150 for arranging the image pieces generated in the original image puzzling unit 130 according to the image puzzling pattern so as to generate the encoded image 20, an encoded image implementing unit 140 for implementing the encoded image 20 or the keycode on the encoded image expressing part 500, and an encoding terminal controlling unit 110 for controlling operations of said elements so as to convert the original image 10 into the encoded image 20 and expresses the converted encoded image on the encoded image expressing part 500.

That is, the encoding terminal controlling unit 110 controls to puzzle the original image 10 obtained by the original image obtaining unit 120 into the image pieces, receives the keycode value, request and receive the image puzzling pattern corresponding to the keycode value through the interface unit 170, and generate the encoded image 20. Further, if the original image obtaining unit 120 receives the plurality of original images 10 and the key input unit 160 receives the plurality of identifiers, the encoding terminal controlling unit 110 controls to request and receive the image puzzling patterns for every identifier corresponding to the keycode, so as to generate one encoded image 20 with the plurality of original images 10. The encoding terminal controlling unit 110 controls to express the encoded image 20 or the keycode value on the encoded image expressing part 500 in which the keycode value is selectively expressed according to the control signal of the key input unit 160.

Further, the image decoding terminal 200 includes an encoded image obtaining unit 220 for obtaining the encoded image 20 or the keycode image as the digital data, a key input unit 270 for receiving the input of the keycode value or the identifier, an interface unit 250 for transmitting decoding information including the keycode value of the identifier through the communication network 320 and receiving the image puzzling pattern from the image encoding server 300, an encoded image puzzling unit 231 for dividing the encoded image 20 in a predetermined size so as to generate the image pieces, an original image restoring unit 232 for re-arranging the image pieces according to the image puzzling pattern to restore the original image 10, an image input unit 260 for receiving the generated digital image data from an image recognizing device 600 recognizing the image and generating the digital image data, an original image comparing unit 240 for comparing the original image restored in the original image restoring unit 232 with the image inputted from the image input unit 260 so as to determine if the original image is identical to the inputted image, a display unit 280 for outputting the restored original image, and a decoding terminal controlling unit 210 for controlling the operations of the elements so as to obtain the original image 10 from the encoded image 20.

That is, the decoding terminal controlling unit 210 controls to puzzle the encoded image 20 among the data obtained from the encoded image obtaining unit 220 into the image pieces, receive the input of the keycode value through the key input unit 270 if the keycode value is not included in the obtained data, and request and receive the image puzzling pattern corresponding to the keycode value through the interface unit 250, wherein if the identifiers are inputted through the key input unit 270, the image puzzling patterns for every identifier corresponding to the keycode value is received through the interface unit 250 and restores the original image 10 according to the received image puzzling pattern, in which if the identifier has been inputted, only the original image corresponding to the identifier is restored.

The original image obtaining unit 120 of the image encoding terminal 100 can be determined according to the formation of original information. The original image obtaining unit 20 can obtain the original image 10 as the form of the digital data through photographing or scanning the original image 10 or obtain the original image 10 through directly receiving the data from a medium in which the original image 10 information is stored as the digital data.

Further, it is preferred that the encoded image obtaining unit 220 of the image decoding terminal 200 obtains the encoded image 20 data through photographing or scanning the encoded image 20 if the encoded image 20 is printed on the encoded image expressing part 500, and directly receives the encoded image 20 data through a data port or a radio frequency reader if the encoded image 20 is stored in the form of the data in the memory of the encoded image expressing part 500. That is, the encoded image expressing part 500 can be formed in the prints, the magnetic card, the smart card, or an RFID tag in order to implement the encoded image or the keycode.

<Exemplary Embodiment: Image Encoding and Decoding Flowchart>

FIG. 4 is a flowchart illustrating a process of encoding and decoding the original image using the system for encoding an original image of FIG. 3.

Referring to FIG. 4, the encoded image 20*b* expressed on the encoded image expressing part 500 is generated from the original image 10 including the fingerprint 10-1, the face picture 10-2, the residence registration number 10-3, the birth date 10-4, and the address 10-4, and is expressed on the encoded image expressing part 500 held by the person (holder) related to the information 10-1 to 10-5. The image decoding terminal 200 obtains the encoded image 20*b* as the digital data 20*c*, restores the fingerprint data 10*c* and face picture data 10*b* according to the identifier, receives the finger print (image data 10*d*) of the holder of the encoded image expressing part 500 recognized by the image recognizing device 600, compares the finger print-related data 10*c* and 10*d* with each other, and outputs the restored face picture data 10*b* on the display unit 280 as the original data 10-2.

First, a process of encoding the image will be described.

The image encoding terminal 100 obtains the original images 10 as the digital data and the original image puzzling unit 130 divides the original images 10-1 to 10-5 in the predetermined size, so as to obtain the image pieces 10*a*. The image encoding terminal 100 receives the input of the keycode value and the identifier for every original images 10-1 to 10-5 and requests the encoding information to the image encoding server 300 so as to receive the image puzzling pattern information for every identifier, and the encoded image generating unit 150 generates the encoded image 20*a* according to the received image puzzling pattern. The generated encoded image 20*a* is expressed in the encoded image expressing part 500 through the encoded image implementing unit 140 (encoded image 20*b*). At this time, it is preferred that the keycode value is expressed on the encoded image expressing part 500 according to the selection signal inputted through the key input unit 160.

Next, a process of decoding the image will be described.

The image decoding terminal 200 obtains the encoded image 20*b* from the encoded image expressing part 500 through the encoded image obtaining unit 220 as the digital data (encoded image 20*c*), and also obtains the keycode value if the keycode value is included. Further, the image decoding terminal 200 receives the identifier through the key input unit 270, wherein if the keycode value is not expressed on the encoded image expressing part 500, the image decoding terminal 200 also receives the keycode value through the key input unit 270. At this time, the identifier corresponds to the face picture 10-2 and the finger print 10-1.

Next, the image decoding terminal 200 transmits the keycode value and the identifiers to the image encoding server 300 so as to request the decoding information and receives the image puzzling pattern. Then, the image decoding terminal 200 extracts the image pieces from the encoded image data 20*c* according to the received image puzzling pattern so as to obtain the face picture data 10*b* and the fingerprint data 10*c*.

Next, the image decoding terminal 200 receives the input of the image 10*d* recognized by the image recognizing device 600 recognizing the fingerprint of the holder, compares the image 10*d* with the finger print data 10*d* so as to determine if the finger print data 10*c* is identical to the recognized image 10*d*, and outputs the face picture data 10*b* on the display unit 280 as the original image 10-2.

Referring to FIG. 4, the image decoding terminal 200 restores only the finger print 10-1 and the face picture 10-2 among the plurality of original images 10-1 to 10-5, in which the image decoding terminal 200 compares the finger print 10-1 with the inputted finger print 10*d* of the holder and outputs the face picture 10-2 on the display unit 280. That is, the image decoding terminal 200 determines if the finger print of the holder of the encoded image expressing part 500 is identical to the finger print expressed in the encoded image expressing part 500 so as to output only the determination result on the display unit 280. Further, the image decoding terminal 200 outputs the face picture 10-2 expressed on the encoded image expressing part 500 so that the user can authenticate the identification of the holder.

The invention claimed is:

1. A system for encoding an original image using an image puzzle-type encoded image in which the original image is divided into a plurality of image pieces having a predetermined size and the image pieces are arranged on an encoded image expressing part according to a designated image puzzling pattern so as to generate the encoded image, the system comprising:

a database for storing a keycode value corresponding to the image puzzling pattern;

an image encoding server for generating the image puzzling pattern corresponding to the received keycode value to transmit the generated image puzzling pattern if receiving the keycode value through a communication network and a request for image encoding information, storing the received keycode value and the generated image puzzling pattern to the database, and reading the image puzzling pattern corresponding to the received keycode value from the database to transmit the read image puzzling pattern if receiving the keycode value through a communication network and a request for image decoding information;

an image encoding terminal for obtaining the original image, dividing the original image into the image pieces having the predetermined size, requesting encoding information including the keycode value to the image encoding server so as to receive the image puzzling pattern, arranging the image pieces according to the received image puzzling pattern so as to generate the encoded image, and expressing the generated encoded image on the encoded image expressing part in which the keycode value is selectively expressed on the encoded image expressing part; and an image decoding terminal for recognizing the encoded image and the keycode value from the encoded image expressing part, requesting an input of the keycode value to a user if it fails to recognize the keycode value so as to receive the input of the keycode value, requesting decoding information including the keycode value to the image encoding server so as to receive the image puzzling pattern, dividing the encoded image into the image pieces according to the received image puzzling pattern so as to re-arrange the image pieces, and obtaining the original image.

2. The system as claimed in claim 1, wherein the original image includes any one or more of a photograph, a picture, a document, a character, a number, a fingerprint, and an iris image.

3. The system as claimed in claim 1, wherein the encoded image is in the form of expressing the keycode value.

4. The system as claimed in claim 2, wherein the image encoding terminal comprises:

an original image obtaining unit for obtaining the original image as digital data;

an original image puzzling unit for dividing the obtained original image into the plurality of image pieces having a predetermined size;

a key input unit for receiving an input of the keycode value;

an interface unit for transmitting the inputted keycode value through the communication network to the image encoding server and receiving the corresponding image puzzling pattern;

an encoded image generating unit for arranging the image pieces generated in the original image puzzling unit according to the image puzzling pattern so as to generate the encoded image;

an encoded image implementing unit for implementing the generated encoded image on the encoded image expressing part; and an encoding terminal controlling unit for controlling operations of said elements to puzzle the original image obtained through the original image obtaining unit into the image pieces, receive the keycode value through the key input unit, request and receive the image puzzling pattern corresponding to the keycode value through the interface unit so as to generate the encoded image, and express the generated encoded image on the encoded image expressing part in which the keycode value is selectively expressed depending on a control signal of the key input unit.

5. The system as claimed in claim 4, wherein the image decoding terminal comprises:

an encoded image obtaining unit for obtaining the encoded image or the keycode image as the digital data;

a key input unit for receiving the input of the keycode value from a user;

an interface unit for requesting the decoding information including the keycode value to the image encoding server through the communication network and receiving the corresponding image puzzling pattern;

an encoded image puzzling unit for dividing the encoded image so as to generate the image pieces;

an original image restoring unit for re-arranging the image pieces according to the received image puzzling pattern so as to restore the original image;

a display unit for outputting the restored original image; and a decoding terminal controlling unit for controlling operations of said elements to puzzle the encoded image in the digital data obtained from the encoded image obtaining unit into the image pieces, receive an input of the keycode value through the key input unit if the encoded image obtaining unit fails to obtain the keycode value in the step of obtaining the digital data, request and receive the image puzzling pattern corresponding to the keycode value through the interface unit, and restore the original image according to the received image puzzling pattern.

6. The system as claimed in claim 5, wherein the image encoding server receives a plurality of identifiers corresponding to one keycode, generates the image puzzling pattern for every received identifier and stores the generated image puzzling pattern in the database, the image encoding terminal receives the input of the identifier for every original image through the key input unit, obtains the plurality of original images through the original image obtaining unit, transmits the keycode and identifier to the encoding server, receives the image puzzling pattern for every identifier, and generates one encoded image corresponding to the plurality of original images, and the image decoding terminal obtains the encoded image configured with the plurality of original images, receives the input of the identifier through the key input unit, requests the image puzzling pattern corresponding to the identifier to the image encoding server so as to receive the requested image puzzling pattern, extracts only the original image corresponding to the received image puzzling pattern from the encoded image through the encoded image puzzling unit so as to restore the original image through the original image restoring unit, and outputs the restored original image on the display unit.

7. The system as claimed in claim 6, wherein the image decoding terminal further comprises an image input unit for receiving the generated digital image data from an image recognizing device recognizing the image and generating the digital image data and an original image comparing unit for comparing the original image restored in the original image restoring unit with an image inputted from the image input unit so as to determine if the restored original image is identical to the inputted image, in which the decoding terminal controlling unit controls the image input unit to receive the input of the image recognized from the image recognizing device and the original image comparing unit to compare the recognized image with the restored original image.

8. The system as claimed in claim 7, wherein the image decoding terminal restores the comparison subject-original image discriminated with the identifier and the original image subjected for being displayed on the display unit through the original image restoring unit, determines if the comparison subject-original image is identical to the image inputted through the image input unit through the original image comparing unit, and displays the determination result on the display unit, in which the original image to be displayed is outputted on the display unit.

9. The system as claimed in claim 8, wherein the encoded image expressing part is expressed with a printed encoded image.

10. The system as claimed in claim 8, wherein the encoded image expressing part can be formed in an IC chip, a smart card, a magnetic card, or an RFID tag which stores the encoded image as the digital data in memory.

11. The system as claimed in claim 3, wherein the image encoding terminal comprises:
- an original image obtaining unit for obtaining the original image as digital data;
- an original image puzzling unit for dividing the obtained original image into the plurality of image pieces having a predetermined size;
- a key input unit for receiving an input of the keycode value;
- an interface unit for transmitting the inputted keycode value through the communication network to the image encoding server and receiving the corresponding image puzzling pattern;
- an encoded image generating unit for arranging the image pieces generated in the original image puzzling unit according to the image puzzling pattern so as to generate the encoded image;
- an encoded image implementing unit for implementing the generated encoded image on the encoded image expressing part; and
- an encoding terminal controlling unit for controlling operations of said elements to puzzle the original image obtained through the original image obtaining unit into the image pieces, receive the keycode value through the key input unit, request and receive the image puzzling pattern corresponding to the keycode value through the interface unit so as to generate the encoded image, and express the generated encoded image on the encoded image expressing part in which the keycode value is selectively expressed depending on a control signal of the key input unit.

12. The system as claimed in claim 11, wherein the image decoding terminal comprises:
- an encoded image obtaining unit for obtaining the encoded image or the keycode image as the digital data;
- a key input unit for receiving the input of the keycode value from a user;
- an interface unit for requesting the decoding information including the keycode value to the image encoding server through the communication network and receiving the corresponding image puzzling pattern;
- an encoded image puzzling unit for dividing the encoded image so as to generate the image pieces;
- an original image restoring unit for re-arranging the image pieces according to the received image puzzling pattern so as to restore the original image;
- a display unit for outputting the restored original image; and
- a decoding terminal controlling unit for controlling operations of said elements to puzzle the encoded image in the digital data obtained from the encoded image obtaining unit into the image pieces, receive an input of the keycode value through the key input unit if the encoded image obtaining unit fails to obtain the keycode value in the step of obtaining the digital data, request and receive the image puzzling pattern corresponding to the keycode value through the interface unit, and restore the original image according to the received image puzzling pattern.

13. The system as claimed in claim 12, wherein the image encoding server receives a plurality of identifiers corresponding to one keycode, generates the image puzzling pattern for every received identifier and stores the generated image puzzling pattern in the database, the image encoding terminal receives the input of the identifier for every original image through the key input unit, obtains the plurality of original images through the original image obtaining unit, transmits the keycode and identifier to the encoding server, receives the image puzzling pattern for every identifier, and generates one encoded image corresponding to the plurality of original images, and the image decoding terminal obtains the encoded image configured with the plurality of original images, receives the input of the identifier through the key input unit, requests the image puzzling pattern corresponding to the identifier to the image encoding server so as to receive the requested image puzzling pattern, extracts only the original image corresponding to the received image puzzling pattern from the encoded image through the encoded image puzzling unit so as to restore the original image through the original image restoring unit, and outputs the restored original image on the display unit.

14. The system as claimed in claim 13, wherein the image decoding terminal further comprises an image input unit for receiving the generated digital image data from an image recognizing device recognizing the image and generating the digital image data and an original image comparing unit for comparing the original image restored in the original image restoring unit with an image inputted from the image input unit so as to determine if the restored original image is identical to the inputted image, in which the decoding terminal controlling unit controls the image input unit to receive the input of the image recognized from the image recognizing device and the original image comparing unit to compare the recognized image with the restored original image.

15. The system as claimed in claim 14, wherein the image decoding terminal restores the comparison subject-original image discriminated with the identifier and the original image subjected for being displayed on the display unit through the original image restoring unit, determines if the comparison subject-original image is identical to the image inputted through the image input unit through the original image comparing unit, and displays the determination result on the display unit, in which the original image to be displayed is outputted on the display unit.

16. The system as claimed in claim 15, wherein the encoded image expressing part is expressed with a printed encoded image.

17. The system as claimed in claim 15, wherein the encoded image expressing part can be formed in an IC chip, a smart card, a magnetic card, or an RFID tag which stores the encoded image as the digital data in memory.

* * * * *